United States Patent
Saruhashi et al.

(10) Patent No.: US 10,040,224 B2
(45) Date of Patent: Aug. 7, 2018

(54) OPTICAL SHAPING APPARATUS AND OPTICAL SHAPING METHOD

(71) Applicant: TOYOTA JIDOSHA KABUSHIKI KAISHA, Toyota-shi, Aichi-ken (JP)

(72) Inventors: Ken Saruhashi, Toyota (JP); Isamu Furukawa, Toyota (JP); Kunihiro Iwamoto, Okazaki (JP); Konosuke Arata, Toyota (JP); Mitsutoshi Asano, Seto (JP); Kentaro Tsuboi, Okazaki (JP); Tetsuji Ueda, Toyota (JP); Junichi Ikeda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 668 days.

(21) Appl. No.: 14/564,644

(22) Filed: Dec. 9, 2014

(65) Prior Publication Data

US 2015/0202805 A1    Jul. 23, 2015

(30) Foreign Application Priority Data

Jan. 22, 2014 (JP) ................................ 2014-009608

(51) Int. Cl.
   *B29C 67/00* (2017.01)
   *B29C 41/22* (2006.01)
   (Continued)

(52) U.S. Cl.
   CPC ............ *B29C 41/22* (2013.01); *B29C 64/124* (2017.08); *B33Y 10/00* (2014.12); *B29C 64/20* (2017.08); *B33Y 30/00* (2014.12)

(58) Field of Classification Search
   CPC .. B29C 67/0062; B29C 67/0085; B33Y 10/00
   See application file for complete search history.

(56) References Cited

U.S. PATENT DOCUMENTS

2003/0013047 A1    1/2003  Tani
2007/0108644 A1 *  5/2007  Cregger ................. B33Y 50/02
                                                      264/1.37
(Continued)

FOREIGN PATENT DOCUMENTS

DE    102011012412 A1    8/2012
JP    S60-247515 A       12/1985
(Continued)

OTHER PUBLICATIONS

JP09141745A—Google Machine Translation, Performed Aug. 4, 2017, 9 pages.*

(Continued)

*Primary Examiner* — Lisa L Herring
(74) *Attorney, Agent, or Firm* — Oliff PLC

(57) ABSTRACT

An optical shaping method according to the present invention is an optical shaping method for shaping a three-dimensional structure by repeating a process for forming a cured resin layer 53 by irradiating an optically curing resin liquid 51 with light so that cured resin layers 53 are laminated. The process for forming the cured resin layer 53 includes, while applying a sheet light Ls to the optically curing resin liquid 51, applying a first light beam L1 intersecting the sheet light Ls to this optically curing resin liquid, and thereby forming the cured resin layer 53 in an area where the sheet light Ls intersects the first light beam L1. The irradiation place of the sheet light Ls is moved and the process for forming the cured resin layer 53 is repeated.

9 Claims, 5 Drawing Sheets

(51) Int. Cl.
    *B33Y 10/00*         (2015.01)
    *B29C 64/124*      (2017.01)
    *B33Y 30/00*         (2015.01)
    *B29C 64/20*       (2017.01)

(56) References Cited

U.S. PATENT DOCUMENTS

2010/0003619 A1*   1/2010   Das ........................ G03B 27/42
                                                                               430/290
2013/0292862 A1*  11/2013   Joyce ................. B29C 67/0096
                                                                               264/40.1

FOREIGN PATENT DOCUMENTS

| JP | S63-251227 A | 10/1988 |
|---|---|---|
| JP | H02-31727 U | 2/1990 |
| JP | A-8-207144 | 8/1996 |
| JP | 09141746 A * | 6/1997 |
| JP | A-2003-145629 | 5/2003 |
| JP | 2008-238715 A | 10/2008 |
| WO | WO2009014500 A1 * | 1/2009 |

OTHER PUBLICATIONS

JPS63251227—EPO Patent Translate, Performed Aug. 4, 2017, 3 pages.*
JP09141746A English Translation by Schreiber Translations, Aug. 2017. (Year: 2017).*
JP63251227A English Translation by FLS, Inc. Aug. 2017. (Year: 2017).*

* cited by examiner

OPTICAL SHAPING APPARATUS AND OPTICAL SHAPING METHOD

INCORPORATION BY REFERENCE

This application is based upon and claims the benefit of priority from Japanese patent application No. 2014-9608, filed on Jan. 22, 2014, the disclosure of which is incorporated herein in its entirety by reference.

BACKGROUND OF THE INVENTION

1. Field of the Invention

The present invention relates to an optical shaping apparatus and an optical shaping method.

2. Description of Related Art

In recent years, an optical shaping method for shaping a three-dimensional (herein after expressed as "3D") structure in which a process for selectively forming a cured resin layer by irradiating an optically curing resin liquid with light is repeatedly performed so that a plurality of cured resin layers are laminated has been receiving attention. In such an optical shaping method, a 3D structure is shaped (i.e., manufactured) by creating data of a plurality of cross sections from design data obtained by a 3D CAD (Computer Aided Design) by slicing a computer model of the 3D structure at a predetermined pitch (i.e., at predetermined intervals), irradiating an optically curing resin liquid with light based on each of the cross section data and thereby curing the optically curing resin liquid into a layer, and successively laminating a plurality of those cured resin layers. The smaller the slicing pitch is, the higher the precision with which the 3D structure can be shaped.

As for the optical shaping method, a typical method is a free liquid surface method like the one disclosed in Japanese Unexamined Patent Application Publication No. H8-207144 in which a stage for supporting an optically shaped object is gradually lowered from the liquid surface of an optically curing resin liquid contained in a tank and cured resin layers are thereby successively formed at the liquid surface of the optically curing resin liquid.

SUMMARY OF THE INVENTION

The present inventors have found the following problem in the above-described optical shaping method.

For example, in the optical shaping method disclosed in Japanese Unexamined Patent Application Publication No. H8-207144, every time one cured resin layer is formed, the stage is lowered and the formed cured resin layer is thereby covered with the optically curing resin liquid. Then, the optically curing resin liquid covering the cured resin layer is irradiated with light and the next cured resin layer is thereby formed. That is, this optical shaping method requires time for lowering the stage, time for letting the optically curing resin liquid flow above the cured resin layer, and time for waiting until the optically curing resin liquid flowed above the cured resin layer is stabilized between the formation of each cured resin layer and the formation of the next cured resin layer. Therefore, there is a problem that as the slicing pitch is reduced in order to improve the shaping precision, productivity is lowered.

The present invention has been made in view of the above-described problem and an object thereof is to provide an optical shaping apparatus and an optical shaping method capable of shaping a 3D object with high accuracy while suppressing the lowering of productivity.

A first exemplary aspect of the present invention is an optical shaping method for shaping a three-dimensional structure by repeating a process for forming a cured resin layer by irradiating an optically curing resin liquid with light so that cured resin layers are laminated, in which the process for forming the cured resin layer includes, while applying a sheet light to the optically curing resin liquid, applying a first light beam intersecting the sheet light to this optically curing resin liquid, and thereby forming the cured resin layer in an area where the sheet light intersects the first light beam, and an irradiation place of the sheet light is moved and the process for forming the cured resin layer is repeated.

The optical shaping method according to this aspect of the present invention does not require the time for letting the optically curing resin liquid flow above the cured resin layer and the time for waiting until the optically curing resin liquid flowed above the cured resin layer is stabilized, both of which are required in the related art method. As a result, it is possible to shape a 3D object with high accuracy while suppressing the lowering of productivity, which would otherwise be caused when the slicing pitch is reduced.

Each of irradiation energy densities of the sheet light and the first light beam is preferably lowered below a critical irradiation energy density at a gel point of the optically curing resin liquid and a sum total of the irradiation energy densities of the sheet light and the first light beam is preferably raised above the critical irradiation energy density. By applying this condition, a cured resin layer can be formed in the area where the sheet light intersects the first light beam.

The first light reflected by a digital mirror device is preferably applied to the optically curing resin liquid. This eliminates the need for scanning the optically curing resin liquid with the light beam and hence improves the productivity.

Further, the optically curing resin liquid preferably includes a multiphoton absorption material. Such an optically curing resin liquid enables shaping with higher precision.

Further, a second light beam intersecting the sheet light may be applied. The application of the second light beam can improve the productivity and/or enable the shaping of a larger object.

Another exemplary aspect of the present invention is an optical shaping apparatus that shapes a three-dimensional structure by repeating a process for forming a cured resin layer by irradiating an optically curing resin liquid with light so that cured resin layers are laminated, including:

a sheet light source that generates sheet light to be applied to the optically curing resin liquid;

a first light source that generates a first light beam intersecting the sheet light; and driving unit that moves the sheet light source, in which an irradiation place of the sheet light is moved by the driving unit, and a process for forming the cured resin layer in an area where the sheet light intersects the first light beam is repeated.

The optical shaping apparatus according to this aspect of the present invention does not require the time for letting the optically curing resin liquid flow above the cured resin layer and the time for waiting until the optically curing resin liquid flowed above the cured resin layer is stabilized, both of which are required in the prior art method. As a result, it is possible to shape a 3D object with high accuracy while suppressing the lowering of the productivity, which would otherwise be caused when the slicing pitch is reduced.

The optical shaping apparatus preferably further includes a digital mirror device that reflects the first light beam generated by the first light source, in which the first light reflected by the digital mirror device is preferably applied to the optically curing resin liquid. This eliminates the need for scanning the optically curing resin liquid with the light beam and hence improves the productivity. Further, the optical shaping apparatus may further include a second light source that generates a second light beam intersecting the sheet light. The use of the second light source can improve the productivity and/or enable the shaping of a larger object.

According to the present invention, it is possible to provide an optical shaping apparatus and an optical shaping method capable of shaping a 3D object with high accuracy while preventing or minimizing the lowering of the productivity.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Specific exemplary embodiments to which the present invention is applied are explained hereinafter in detail with reference to the drawings. However, the present invention is not limited to exemplary embodiments shown below. Further, the following descriptions and the drawings are simplified as appropriate for clarifying the explanation.

First Exemplary Embodiment

Figure 1:
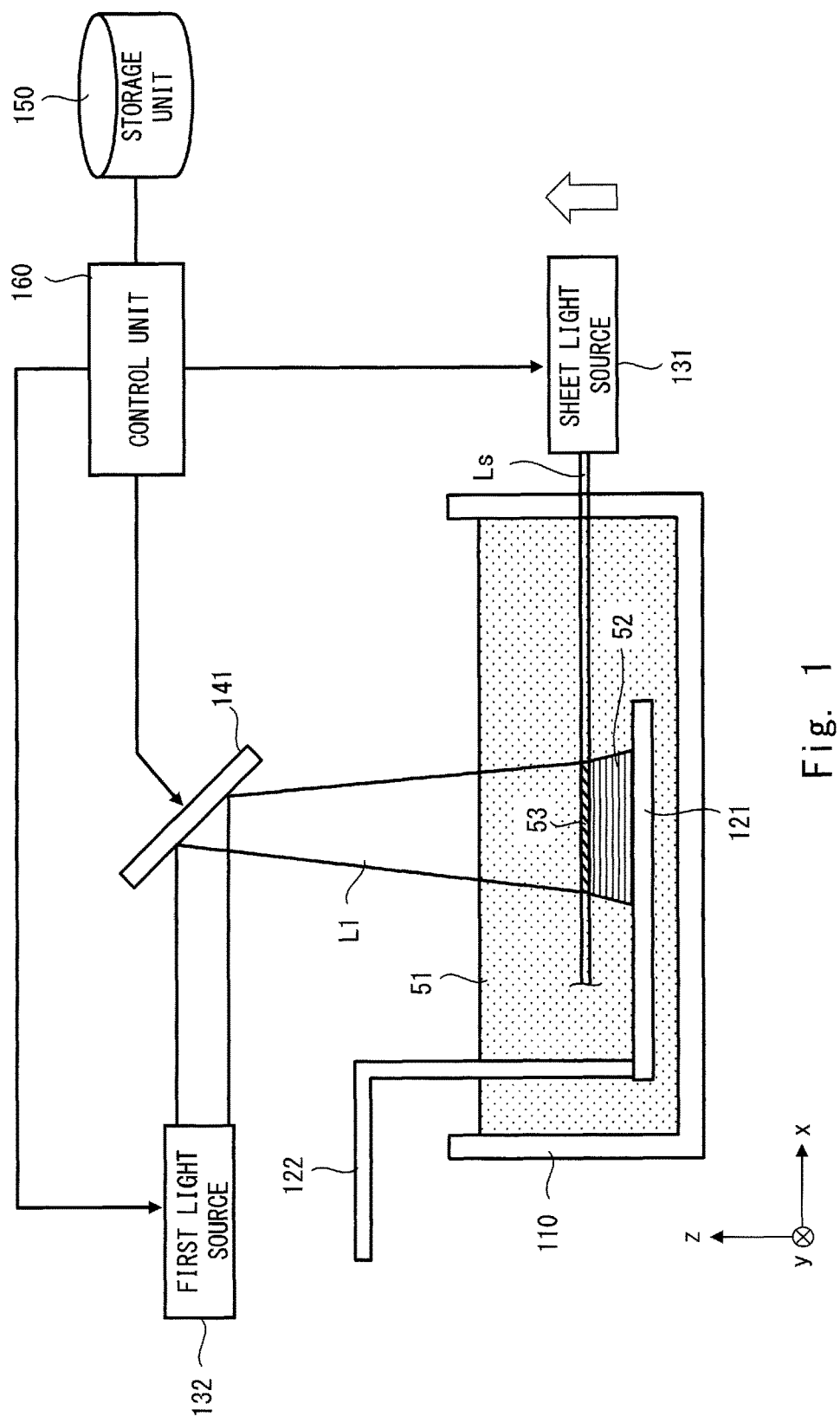
FIG. 1 is a schematic cross section of an optical shaping apparatus according to a first exemplary embodiment.

Firstly, an optical shaping apparatus according to a first exemplary embodiment is explained with reference to FIG. 1. FIG. 1 is a schematic cross section of an optical shaping apparatus according to a first exemplary embodiment. As shown in FIG. 1, the optical shaping apparatus according to the first exemplary embodiment includes a container tank 110, a stage 121, a rod 122, a sheet light source 131, a first light source 132, a digital mirror device (DMD) 141, a storage unit 150, and a control unit 160.

Note that, needless to say, the right-hand xyz-coordinate system shown in FIG. 1 is shown just for the sake of convenience for explaining the positional relation among the components. In FIG. 1, the xy-plane forms a horizontal plane and the z-axis direction is the vertical direction. More specifically, the positive direction on the z-axis is the vertically upward direction.

The container tank 110 is a box-shaped tank with an opened top. An optically curing resin liquid 51 such as a UV curing resin liquid is contained in the container tank 110. It should be noted that light emitted from the sheet light source 131 is applied to the optically curing resin liquid 51 contained in the container tank 110 through a side wall of the container tank 110. Therefore, the container tank 110 is optically transparent and made of, for example, glass, a transparent resin, or the like. The optically curing resin liquid 51 is preferably made of a multiphoton absorption material. By using the multiphoton absorption material, a shaped object 52 can be shaped (i.e., manufactured) more precisely.

The stage 121 is a pedestal for supporting the shaped object 52 formed inside the container tank 110. In other words, the shaped object 52 is formed above the stage 121 disposed inside the container tank 110. The stage 121 is supported by the rod 122 and can be moved in the vertical direction (z-axis direction). Therefore, the shaped object 52 can be easily taken out from the container tank 110. Note that the shaped object 52 may be formed directly above the bottom surface of the container tank 110 without using the stage 121 and rod 122. That is, the stage 121 and rod 122 are not indispensable for the optical shaping apparatus.

The sheet light source 131 is, for example, a laser sheet light source and emits planar light (sheet light) Ls parallel to the xy-plane. As described above, the sheet light Ls emitted from the sheet light source 131 is applied to the optically curing resin liquid 51 through the side wall of the container tank 110. The thickness of the sheet light Ls is adjusted to conform to the slicing pitch p of the 3D structure. Further, as indicated by the arrow in the figure, the sheet light source 131 can be moved in the vertical direction (z-axis direction) by driving unit. Specifically, every time a new cured resin layer 53 is formed, the sheet light source 131 is moved upward (toward the positive side in the z-axis direction) by a distance corresponding to the slicing pitch p. In this manner, the shaped object 52 is formed by successively forming and laminating cured resin layers 53 from the bottom to the top. Note that as described later in detail, no cured resin layer 53 is formed by the application of the sheet light Ls alone. That is, a cured resin layer 53 is formed in an area(s) where the sheet light Ls intersects a light beam L1.

The first light source 132 includes, for example, a UV-ray lamp and a condensing lens, and emits a light beam (first light beam) L1. The light beam L1 is reflected by the DMD 141 and applied to the optically curing resin liquid 51 from above (from the positive side in the z-axis direction). Note that as described later in detail, no cured resin layer 53 is formed by the application of the light beam L1 alone.

The DMD 141 is controlled by the control unit 160 so that the shape of the irradiation spot of the light beam L1 in the place where the light beam L1 intersects the sheet light Ls conforms to the cross-sectional shape of the 3D structure. In the optical shaping apparatus according to the first exemplary embodiment, since the DMD 141 is used, there is no need to scan the optically curing resin liquid with the light beam L1, thus achieving high productivity. However, the DMD 141 may not be used and the optically curing resin liquid may be scanned with the light beam L1. Note that instead of irradiating the entire cross-sectional shape of the 3D structure with the light beam L1 by using the DMD 141, the cross-sectional shape of the 3D structure may be divided into a plurality of sections and each section may be irradiated with the light beam L1 in succession. By doing so, an inexpensive low-power first light source 132 can be used, though productivity is lowered.

Figure 2:
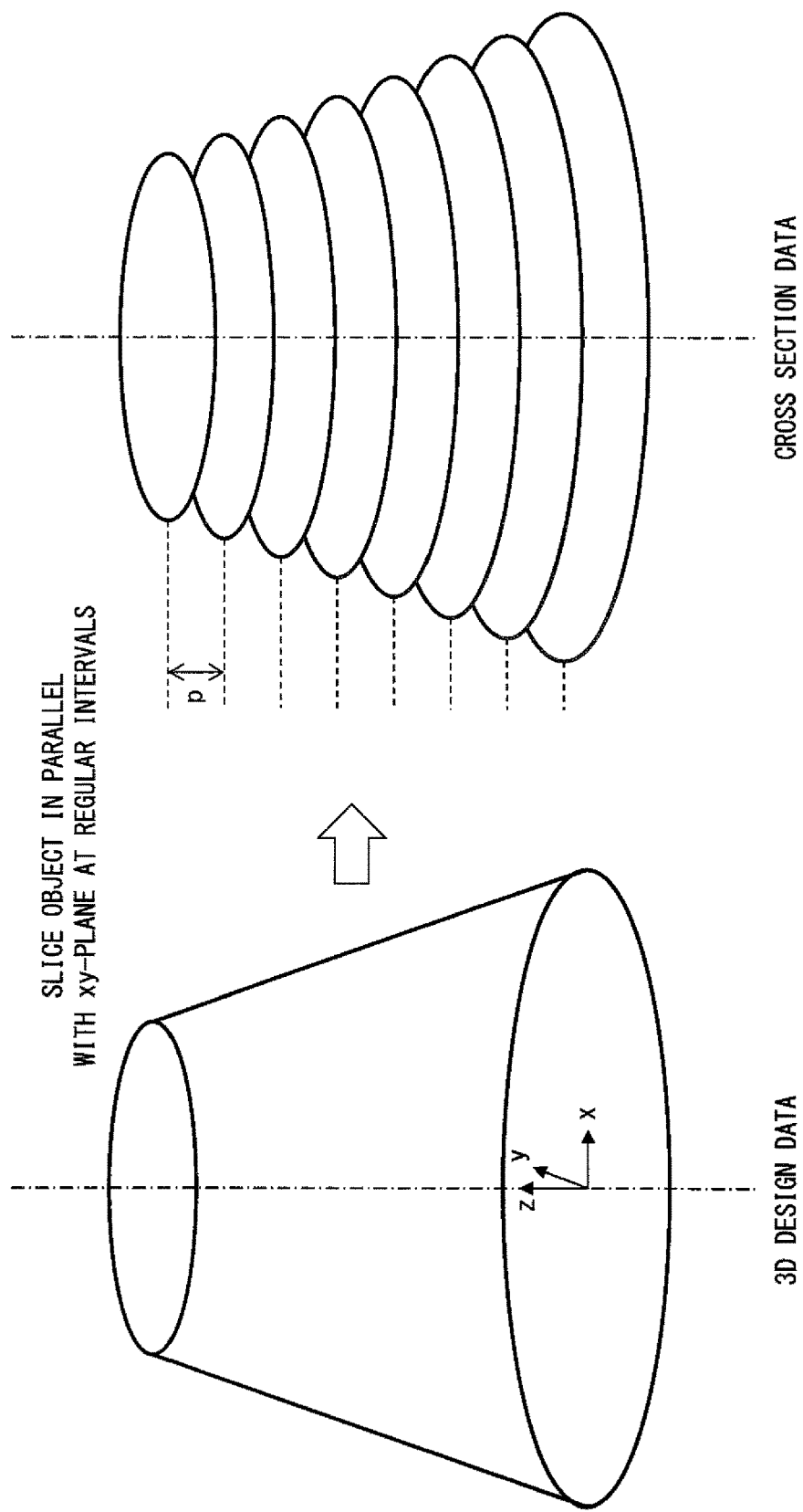
FIG. 2 shows an image showing cross section data obtained by slicing a 3D structure at a predetermined pitch p.

The storage unit 150 stores data of cross sections obtained by slicing a computer model of the 3D structure at a predetermined pitch (i.e., at predetermined intervals). FIG. 2 shows an image showing cross section data obtained by slicing the computer model of the 3D structure at the predetermined pitch p. As shown in FIG. 2, data of a plurality of cross sections is created from 3D design data of the 3D structure obtained by a 3D CAD by slicing a computer model of that 3D structure at a predetermined pitch p. In the example shown in FIG. 2, 3D design data of a conical pedestal whose central axis coincides with the z-axis is sliced in parallel with the xy-plane at a predetermined pitch p. In this way, a plurality of circles having different diameters are obtained as cross section data. In the optical shaping apparatus according to the first exemplary embodiment, cured resin layers 53 each of which corresponds to a respective one of the cross section data are successively formed and laminated, so that a shaped object 52 is formed.

The control unit 160 controls the sheet light source 131, the first light source 132, and the DMD 141 based on the data stored in the storage unit 150. Specifically, the control unit 160 controls the irradiation energy density of the sheet light Ls emitted from the sheet light source 131, the thickness of the sheet light Ls, and the upward movement of the sheet light source 131. Further, the control unit 160 also controls the irradiation energy density of the light beam L1 emitted from the first light source 132. Furthermore, the control unit 160 also controls the DMD 141 so that the shape of the irradiation spot of the light beam L1 in the place where the light beam L1 intersects the sheet light Ls conforms to the cross-sectional shape of the 3D structure at that height.

As described above, in the optical shaping device according to the first exemplary embodiment, only part of the optically curing resin liquid 51 located in the area where the sheet light Ls intersects the light beam L1 is cured and a cured resin layer 53 is formed in that area. In other words, part of the optically curing resin liquid 51 located in the places where only the sheet light Ls or the light beam L1 is applied is not cured. That is, there is a condition(s) for the irradiation energies of the sheet light Ls and the light beam L1.

Figure 3:
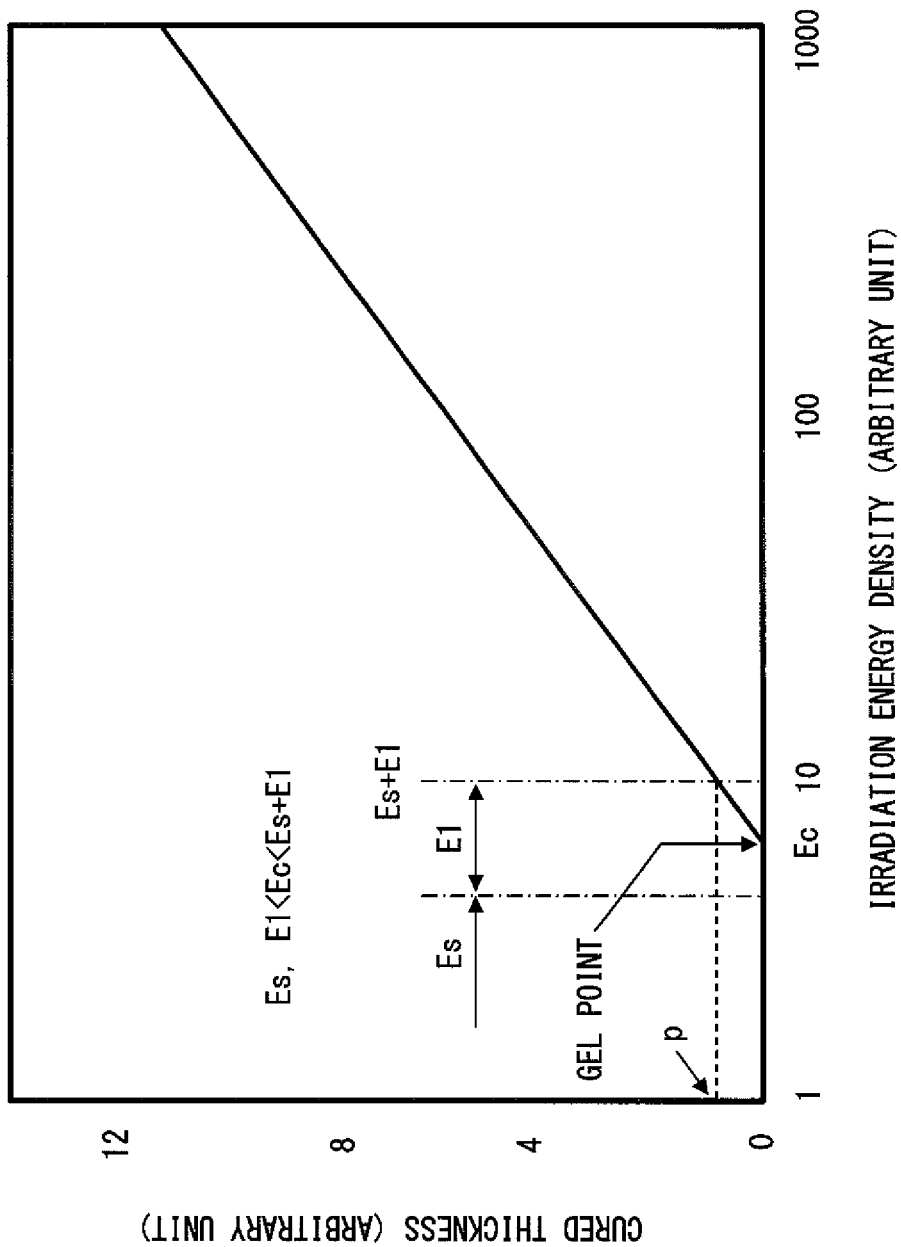
FIG. 3 is a graph showing a relation between irradiation energy per unit area (irradiation energy density) and cured thicknesses.

An irradiation energy density Es of the sheet light Ls and an irradiation energy density E1 of the light beam L1 are explained with reference to FIG. 3. FIG. 3 is a graph showing a relation between irradiation energy per unit area (irradiation energy densities) and thicknesses of cured resin layers (hereinafter referred to as "cured thicknesses"). The horizontal axis in FIG. 3 represents irradiation energy densities (arbitrary unit) and the vertical axis represents cured thicknesses (arbitrary unit). Note that the horizontal axis in FIG. 3 is in a logarithm scale. As shown in FIG. 3, the logarithm of irradiation energy densities has a linear relation with cured thicknesses. Further, the optically curing resin liquid 51 is not cured until the irradiation energy density exceeds a critical irradiation energy density Ec at a gel point.

As described above, the irradiation energy densities of the sheet light Ls and the light beam L1 are adjusted so that the optically curing resin liquid 51 is not cured when only the sheet light Ls or the light beam L1 is applied to the optically curing resin liquid 51. To that end, the irradiation energy density Es of the sheet light Ls and the irradiation energy density E1 of the light beam L1 are adjusted so that each of them is lower than the critical irradiation energy density Ec. That is, they are adjusted so that a relation "Es, E1<Ec" is satisfied.

On the other hand, the irradiation energy densities of the sheet light Ls and the light beam L1 are adjusted so that the optically curing resin liquid 51 is cured when the sheet light Ls and the light beam L1 are simultaneously applied to the optically curing resin liquid 51. To that end, the irradiation energy density Es of the sheet light Ls and the irradiation energy density E1 of the light beam L1 are adjusted so that the sum total of them is higher than the critical irradiation energy density Ec. That is, they are adjusted so that a relation "Ec<Es+E1" is satisfied.

Therefore, the irradiation energy density Es of the sheet light Ls and the irradiation energy density E1 of the light beam L1 are adjusted so that the below-shown Expression (1) is satisfied.

$$Es, E1 < Ec < Es + E1 \qquad (1)$$

Since the cured thickness is equal to the slicing pitch p, the sum total (Es+E1) of the irradiation energy density Es of the sheet light Ls and the irradiation energy density E1 of the light beam L1 is determined according to the slicing pitch p as shown in FIG. 3. Note that the irradiation energy density Es of the sheet light Ls is in proportion to the output of the sheet light source 131 and its irradiation time. Similarly, the irradiation energy density E1 of the light beam L1 is in proportion to the output of the first light source 132 and its irradiation time. Therefore, the irradiation energy density Es of the sheet light Ls and the irradiation energy density E1 of the light beam L1 can be adjusted by adjusting the outputs of the sheet light source 131 and the first light source 132 and their irradiation times.

Next, an optical shaping method according to the first exemplary embodiment is explained with reference to FIGS. 1 and 2.

Firstly, as shown in FIG. 2, data of a plurality of cross sections is created from 3D design data of the 3D structure obtained by a 3D CAD by slicing a computer model of that 3D structure at a predetermined pitch p.

Next, as shown in FIG. 1, while applying horizontal sheet light Ls (thickness p) to the optically curing resin liquid 51 located directly above the stage 121 submerged in the optically curing resin liquid 51, a light beam L1 intersecting the sheet light Ls is applied to the optically curing resin liquid 51 from above. In this process, the shape of the irradiation spot of the light beam L1 in the place where the light beam L1 intersects the sheet light Ls is controlled based on the cross section data of the first layer. As a result, a cured resin layer 53 having a thickness p corresponding to the cross section data of the first layer is formed in the place where the sheet light Ls intersects the light beam L1. The optical axis of the light beam L1 is preferably perpendicular to the sheet light Ls, though it does not necessarily have to be perpendicular to the sheet light Ls.

Note that as explained above in detail with reference to FIG. 3, the irradiation energy density Es of the sheet light Ls and the irradiation energy density E1 of the light beam L1 are adjusted so that each of them is lower than the critical irradiation energy density Ec at the gel point in order to prevent the optically curing resin liquid 51 from being cured in the areas where only the sheet light Ls or the light beam L1 is applied to the optically curing resin liquid 51.

On the other hand, the irradiation energy density Es of the sheet light Ls and the irradiation energy density E1 of the light beam L1 are adjusted so that the sum total of them is higher than the critical irradiation energy density Ec so that the optically curing resin liquid 51 is cured in the area(s) where the sheet light Ls intersects the light beam L1.

Next, as shown in FIG. 1, the sheet light source 131 is moved upward (toward the positive side in the z-axis direction) by a distance corresponding to the slicing pitch p. That is, the irradiation place of the sheet light Ls is moved upward by the slicing pitch p. Then, while applying the horizontal sheet light Ls (thickness p) to the optically curing resin liquid 51 again, the light beam L1 intersecting the sheet light Ls is applied to this optically curing resin liquid from above. In this process, the shape of the irradiation spot of the light beam L1 in the place where the light beam L1 intersects the sheet light Ls is controlled based on the cross section data of the second layer. As a result, a cured resin layer 53 having a thickness p corresponding to the cross section data of the second layer is formed in the place where the sheet light Ls intersects the light beam L1.

In this manner, every time one cured resin layer 53 is formed, the sheet light source 131, i.e., the irradiation place of the sheet light Ls is moved upward by the slicing pitch p. Then, while applying the horizontal sheet light Ls having a thickness p to the optically curing resin liquid 51, the light beam L1 intersecting the sheet light Ls is applied to this optically curing resin liquid from above, so that new cured resin layers 53 are successively formed in areas where the sheet light Ls intersects the light beam L1. As a result, a shaped object 52, which is obtained by laminating a plurality of cured resin layers 53, can be formed.

Next, advantageous effects in the optical shaping apparatus and the optical shaping method according to the first exemplary embodiment are explained.

As described above, the smaller the slicing pitch is, the higher the precision with which the 3D structure can be shaped. However, in the related art optical shaping apparatus and the optical shaping method, every time one cured resin layer is formed, the stage is lowered and the formed cured resin layer is thereby covered with the optically curing resin liquid. Then, the optically curing resin liquid covering the cured resin layer is irradiated with light and the next cured resin layer is thereby formed. That is, this optical shaping method requires time for lowering the stage, time for letting the optically curing resin liquid flow above the cured resin layer, and time for waiting until the optically curing resin liquid flowed above the cured resin layer is stabilized between the formation of each cured resin layer and the formation of the next cured resin layer. Therefore, there is a problem that as the slicing pitch is reduced in order to improve the shaping precision, the productivity is lowered.

In contrast to this, in the optical shaping apparatus and the optical shaping method according to this exemplary embodiment, every time one cured resin layer is formed, the next cured resin layer is formed by moving upward the irradiation place of the sheet light Ls, which is applied from the outside of the optically curing resin liquid 51, instead of moving the stage 121, which is submerged in the optically curing resin liquid 51. That is, in comparison to the related art optical shaping apparatus and the optical shaping method, the optical shaping apparatus and the optical shaping method according to this exemplary embodiment can completely eliminate the need for the time for letting the optically curing resin liquid flow above the cured resin layer and the time for waiting until the optically curing resin liquid flowed above the cured resin layer is stabilized, and thereby dramatically improve the productivity.

Therefore, in the optical shaping apparatus and the optical shaping method according to this exemplary embodiment, even when the slicing pitch p is reduced, the shaping time (i.e., the manufacturing time) does not increase. On the contrary, the cured thickness has a linear relation with the logarithm of the irradiation energy density, instead of with the irradiation energy density itself, as shown in FIG. 3. Therefore, when the slicing pitch p (i.e., the cured thickness) is reduced, the irradiation energy density required for the curing is exponentially reduced. That is, assuming that the outputs of the sheet light source 131 and the first light source 132 are unchanged, the shaping time (i.e., the manufacturing time) can be reduced, instead of being increased, by reducing the slicing pitch p.

As described above, the optical shaping apparatus and the optical shaping method according to this exemplary embodiment can shape (i.e., manufacture) a 3D object with high accuracy while preventing or minimizing the lowering of the productivity.

Second Exemplary Embodiment

Figure 4:
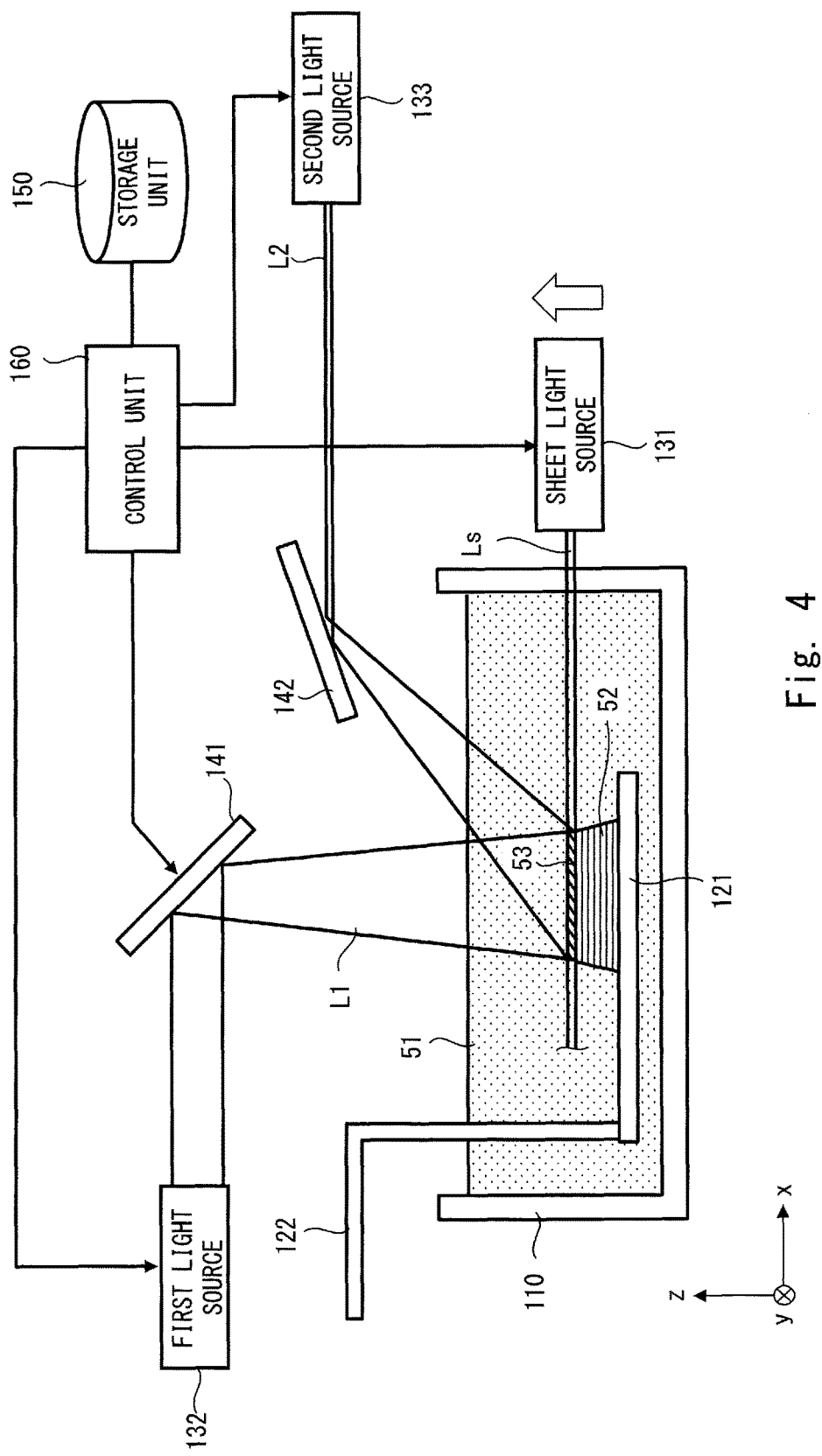
FIG. 4 is a schematic cross section of an optical shaping apparatus according to a second exemplary embodiment.
Figure 5:
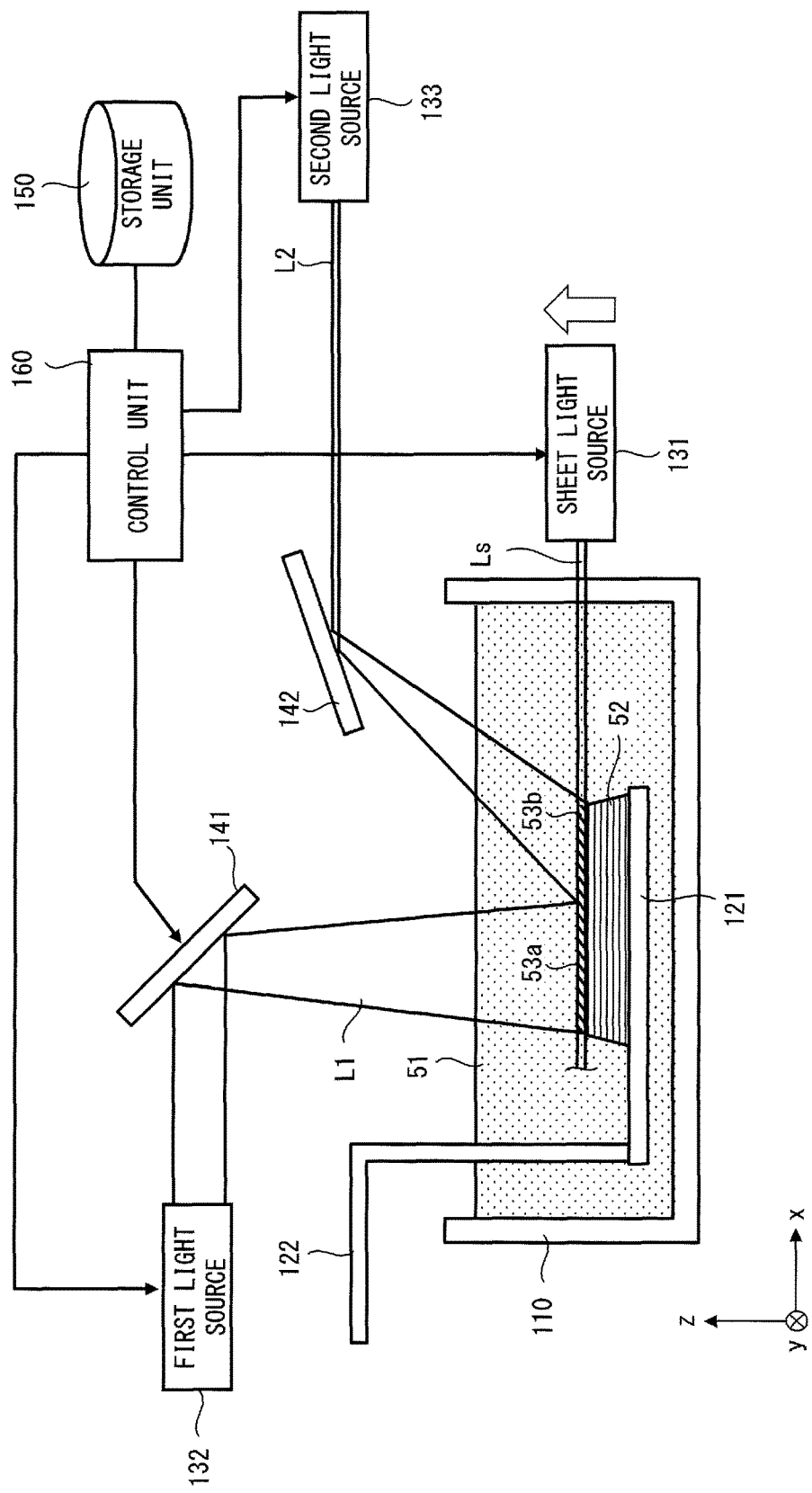
FIG. 5 is a schematic cross section of an optical shaping apparatus according to the second exemplary embodiment.

Next, an optical shaping apparatus according to a second exemplary embodiment is explained with reference to FIGS. 4 and 5. FIGS. 4 and 5 are schematic cross sections of optical shaping apparatuses according to a second exemplary embodiment. The optical shaping apparatus according to the second exemplary embodiment includes a second light source 133 and a DMD (Digital Mirror Device) 142 in addition to the components of the optical shaping apparatus according to the first exemplary embodiment. The other configuration of the optical shaping apparatus according to the second exemplary embodiment is similar to that of the optical shaping apparatus according to the first exemplary embodiment, and therefore its detailed explanation is omitted here.

The second light source 133 is similar to the first light source 132. That is, the second light source 133 includes, for example, a UV-ray lamp and a condensing lens, and emits a light beam (second light beam) L2. The light beam L2 is reflected by the DMD 142 and applied to the optically curing resin liquid 51 from above (from the positive side in the z-axis direction). No cured resin layer 53 is formed by the application of the light beam L2 alone.

The DMD 142 is similar to the DMD 141, and is controlled by the control unit 160. In FIG. 4, the shape of the irradiation spot in the place where the light beam L1 reflected by the DMD 141 intersects the sheet light Ls conforms to the cross-sectional shape of the 3D structure. Further, the shape of the irradiation spot in the place where the light beam L2 reflected by the DMD 142 intersects the sheet light Ls also conforms to the cross-sectional shape of the 3D structure. In this manner, in the optical shaping apparatus according to the second exemplary embodiment, the light beam L1 reflected by the DMD 141 and the light beam L2 reflected by the DMD 142 are superimposed and simultaneously applied to the place where the these light beams intersect the sheet light Ls. By doing so, the optical shaping apparatus according to the second exemplary embodiment can form the cured resin layer 53 in a shorter time than that required in the optical shaping apparatus according to the first exemplary embodiment.

In contrast to this, in FIG. 5, the light beam L1 reflected by the DMD 141 and the light beam L2 reflected by the DMD 142 are applied to the place where the light beam L1 or L2 intersects the sheet light Ls in such a manner that the light beams L1 and L2 do not overlap with each other. As a result, cured resin layers 53a and 53b are formed in respective areas where the sheet light Ls intersects the light beams L1 and L2, respectively. Therefore, the optical shaping apparatus according to the second exemplary embodiment can shape (i.e., manufacture) a 3D structure having a large cross-sectional shape, which cannot be shaped (i.e., manufactured) by the optical shaping apparatus according to the first exemplary embodiment.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical shaping method for shaping a three-dimensional structure by repeating a process for forming a cured resin layer by irradiating an optically curing resin liquid with light so that cured resin layers are laminated, wherein
the process for forming the cured resin layer comprises, while applying a sheet light to the optically curing resin liquid parallel to a liquid surface of the optically curing resin liquid, applying a first light beam intersecting the sheet light to the optically curing resin liquid, and thereby forming the cured resin layer parallel to the liquid surface in an area where the sheet light intersects the first light beam, and
an irradiation place of the sheet light is moved in a direction of laminating the cured resin layer without moving the optically curing resin liquid, the direction being a vertically upward direction toward the liquid surface, and the process for forming the cured resin layer is repeated.

2. The optical shaping method according to claim 1, wherein
each of irradiation energy densities of the sheet light and the first light beam is lowered below a critical irradiation energy density at a gel point of the optically curing resin liquid, and
a sum total of the irradiation energy densities of the sheet light and the first light beam is raised above the critical irradiation energy density.

3. The optical shaping method according to claim 1, wherein the first light reflected by a digital mirror device is applied to the optically curing resin liquid.

4. The optical shaping method according to claim 1, wherein the optically curing resin liquid comprises a multiphoton absorption material.

5. The optical shaping method according to claim 1, wherein a second light beam intersecting the sheet light is applied to the optically curing resin liquid.

6. The optical shaping method according to claim 1, wherein a shape of an irradiation spot of the first light beam in the area where the sheet light intersects the first light beam corresponds to a cross-sectional shape of the three-dimensional structure.

7. An optical shaping method for shaping a three-dimensional structure by repeating a process for forming a cured resin layer by irradiating an optically curing resin liquid with light so that cured resin layers are laminated, wherein
the process for forming the cured resin layer comprises, while applying a sheet light to the optically curing resin liquid parallel to a liquid surface of the optically curing resin liquid, applying one or more light beams intersecting the sheet light to the optically curing resin liquid, and thereby forming the cured resin layer parallel to the liquid surface in an area where the sheet light intersects the one or more light beams,
an irradiation place of the sheet light is moved in a direction of laminating the cured resin layer without moving the optically curing resin liquid, the direction being a vertically upward direction toward the liquid surface, and the process for forming the cured resin layer is repeated, and
a shape of a total irradiation spot of the one or more light beams in the area where the sheet light intersects the one or more light beams corresponds to a cross-sectional shape of the three-dimensional structure.

8. The optical shaping method according to claim 7, wherein the one or more light beams includes a plurality of light beams.

9. The optical shaping method according to claim 8, wherein a shape of an irradiation spot of each of the plurality of light beams in the area where the sheet light intersects the plurality of light beams corresponds to a cross-sectional shape of the three-dimensional structure.

* * * * *